US008813196B2

(12) United States Patent
Weller et al.

(10) Patent No.: US 8,813,196 B2
(45) Date of Patent: Aug. 19, 2014

(54) WEB-BASED CONFERENCE COLLABORATION TOOL WITH DYNAMIC CONTENT AND ROLES

(71) Applicant: Unisys Corporation, Blue Bell, PA (US)

(72) Inventors: Jedidiah Weller, Orangeville, PA (US); Ross Bower, Nottingham, PA (US); Sajal Desai, Toms River, NJ (US); Phuc Trinh, Philadelphia, PA (US); MeiZhi Li, Philadelphia, PA (US); Michael Kain, Malvern, PA (US); Steve Koss, Malvern, PA (US); James Thompson, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 39 days.

(21) Appl. No.: 13/675,025

(22) Filed: Nov. 13, 2012

(65) Prior Publication Data

US 2013/0239180 A1 Sep. 12, 2013

Related U.S. Application Data

(60) Provisional application No. 61/609,664, filed on Mar. 12, 2012, provisional application No. 61/625,442, filed on Apr. 17, 2012, provisional application No. 61/642,429, filed on May 3, 2012.

(51) Int. Cl.
*G06F 21/00* (2013.01)
(52) U.S. Cl.
USPC ............................ 726/4; 726/5; 726/7; 726/9
(58) Field of Classification Search
USPC .......................................................... 726/4
See application file for complete search history.

(56) References Cited

U.S. PATENT DOCUMENTS

| | | | | |
|---|---|---|---|---|
| 6,738,964 | B1* | 5/2004 | Zink et al. | 717/105 |
| 2002/0143877 | A1* | 10/2002 | Hackbarth et al. | 709/205 |
| 2003/0085923 | A1* | 5/2003 | Chen et al. | 345/751 |
| 2003/0163547 | A1* | 8/2003 | Beisty et al. | 709/217 |
| 2003/0167302 | A1* | 9/2003 | Zhu et al. | 709/204 |
| 2004/0085355 | A1* | 5/2004 | Harmes et al. | 345/751 |
| 2004/0107249 | A1* | 6/2004 | Moser et al. | 709/204 |
| 2004/0107256 | A1* | 6/2004 | Odenwald et al. | 709/205 |
| 2004/0174392 | A1* | 9/2004 | Bjoernsen et al. | 345/751 |
| 2005/0132000 | A1* | 6/2005 | Richardson et al. | 709/204 |
| 2013/0159892 | A1* | 6/2013 | Suraj et al. | 715/762 |
| 2013/0238725 | A1* | 9/2013 | Trinh et al. | 709/206 |
| 2013/0239013 | A1* | 9/2013 | Desai et al. | 715/744 |

\* cited by examiner

*Primary Examiner* — Kambiz Zand
*Assistant Examiner* — Yonas Bayou
(74) *Attorney, Agent, or Firm* — James E. Goepel

(57) ABSTRACT

A conference collaboration system has a server connected to a network and configured to generate a page view requested by a client device over the network and provide dynamic content associated with the requested page view for display on the device; and a database configured to store the dynamic content, update the dynamic content in response to commands from the server, and provide the dynamic content to the server in response to requests from the server, wherein the dynamic content is associated with a plurality of services, each shown in a page view, and the dynamic content and the services are associated with a conference. The server can determine an authorization level of a user interacting with the client device and provide a page view and dynamic content in response to the authorization level, and the dynamic content is updated or created in response to or for actions during the conference.

20 Claims, 16 Drawing Sheets

WEB-BASED CONFERENCE COLLABORATION TOOL WITH DYNAMIC CONTENT AND ROLES

CROSS-REFERENCE TO RELATED APPLICATIONS

This non-provisional patent application is related to U.S. Patent Application Ser. No. 61/609,664, entitled "Interactive Conference and Conference Room System and Methods," filed Mar. 12, 2012, the entire contents of which are hereby incorporated herein by reference in their entirety.

This non-provisional patent application is related to U.S. Patent Application Ser. No. 61/625,442, entitled "Meeting Manager" filed Apr. 17, 2012, the entire contents of which are hereby incorporated herein by reference in their entirety.

This non-provisional patent application claims priority under 35 U.S.C. §119 to U.S. Provisional Patent Application Ser. No. 61/642,429, entitled "Meeting Management System and Methods Related Thereto," and filed May 3, 2012, the entire contents of which are hereby incorporated herein by reference in their entirety.

TECHNICAL FIELD

The present invention relates generally to meeting management tools, and more specifically to a web-based conference collaboration tool.

BACKGROUND

A meeting management tool provides attendees at a meeting to interact and obtain supplemental meeting content. For example, visual slides using presentation software have been commonly used in speeches, meetings, classrooms, and conferences. Meeting management tools, such as presentation software, may add to user experience during a meeting or conference. Attendees may retain more information from the meeting or conference because they are able to hear and visualize the information presented during the meeting or conference. As a result, technology has been used to enhance an attendee's experience during a conference or meeting.

People attend conferences and meetings for a plurality of reasons. Often, attendees are present at a conference or meeting to learn about a particular subject. Generally, attendees leant more at a conference and have a better experience if the conference includes some degree interactivity. Conference interactivity may be between a presenter and attendees, attendees and other attendees, or presenter assistants and attendees. While interaction may be done with or without meeting management tools, interactivity for the sake of this disclosure shall mean interaction using technology such as meeting management tools.

While interactivity is generally a beneficial addition to a conference or meeting, there are instances where interactivity may no longer add to the user experience and can be a distraction. In addition, a presenter at a meeting or conference may fear that too much interaction distracts the attendees from the presentation. Thus, a meeting management tool should give attendees and presenters a choice in the level of interaction that they desire.

Conventionally, meeting management tools may be expensive, elaborate, or difficult to use. In addition, meeting management tools required a laptop computer, a connection to a designated network, and a special piece of software or data that must be downloaded and installed before the conference begins. Under this conventional paradigm, attendees may forget to install the conference software or data before the conference begins. If an attendee cannot access the conventional meeting management tools, their conference experience might be diminished throughout. Alternatively, an attendee may spend the early portion of the conference attempting to resolve their lack of preparation by installing the conference software after the conference begins, thereby missing important information delivered at the beginning of the conference. Also, conventional meeting management tools may hinder a presenter and delay a conference while the presenter attempts to resolve technology issues. Also conducting a meeting without technology may burden a presenter in many ways, for example, a presenter may need to print and distribute meeting notes, update program agendas, and update these materials whenever a change is made. Thus, an on-demand tool that requires no set-up time is desired for conference attendees and presenters. This on-demand tool should also be simple and easy to use so the user may interact without missing important conference material.

Also, conference attendees may be burdened by carrying a laptop computer to a conference, so many attendees may rely only on more mobile devices, like tablets and smart phones. Thus, a conference collaboration tool that functions on mobile technology for attendee convenience is desired.

The presenter, presenter assistant, or hosting entity may desire to acquire analytical information from the attendees at a conference or event such as name, email address, events attended, and application usage. Thus, a conference collaboration tool that consumes information regarding the attendees and their experiences is desired.

SUMMARY

The systems and methods described herein attempt to overcome the drawbacks discussed above by providing a web-based conference collaboration tool that provides dynamic content pertinent to an attendee's conference. The conference collaboration tool of the exemplary embodiments runs on mobile devices, such as a tablet or a smart phone, and more specifically, may use a web browser to access the dynamic content. When the conference collaboration tool runs on mobile technology, the conference collaboration tool can generate different views and formats depending on whether the attendee accessed the conference collaboration tool with a smart phone or a tablet and based on the operating system of an attendee's device. The conference collaboration tool also provides different content, data, and privileges to different users depending on their role. The conference collaboration tool provides attendees to a live, in-person conference dynamic content and interactivity during the conference, such as chat service, documents view, notifications, and surveys.

In one embodiment, a conference collaboration system comprises a server connected to a network and configured to generate a page view requested by a client device over the network and provide dynamic content associated with the requested page view for display on a browser of the client device; and a database connected to the server configured to store the dynamic content, update the dynamic content in response to commands from the server, and provide the dynamic content to the server in response to requests from the server, wherein the dynamic content is associated with a plurality of services, each service is shown in a page view, and the dynamic content and the services are associated with a conference, wherein the server is configured to determine an authorization level of a user interacting with the client device and provide at least one of the plurality of page views and at least a portion of the dynamic content in response to the authorization level, and wherein the dynamic content is updated or created in response to or for actions during the conference.

In another embodiment, a computer-implemented method comprises receiving, by a server, a request for a page view and dynamic content from a web browser of a client device through a network during a conference; determining, by a server, an authorization level of a user interacting with the client device; accessing, by a server, the dynamic content associated with the conference from a database, wherein the dynamic content is to be input into content tables in the page view displayed on the client device; filtering, by a server, the dynamic content from the database according to the authorization level; generating, by a server, the page view for the client device; and providing, by a server, the dynamic content for the page view to the client device, wherein page views are generated and dynamic content is provided to the client device when a user inputs a prompt and at periodic intervals, wherein the dynamic content compiled in preparation of the conference or during the conference.

In yet another embodiment, a computer-implemented method comprises receiving, by a server, a request from web browser of a client device of an attendee or organizer through a network during a conference for a document displayed in a document service associated with the conference; determining, by a server, an authorization level of a user interacting with the client device; accessing, by a server, the document requested by the client device; determining, by a server, whether the document may be viewed by the client device according to the authorization level; generating, by a server, the page view for the document if the client device has access to the document; and providing, by a server, the dynamic content of the document in the page view to the client device.

In yet another embodiment, a computer implemented method of providing a chat service for a conference collaboration tool, the method comprises generating, by a server, a chat service page view in response to a request for the chat service from a client device of an attendee of a conference; retrieving, by a server, all messages that are stored in a database for a conversation history of the chat service associated with the conference and are compiled from at least one attendee or organizer in preparation of the conference and during the conference; and sending, by a server, the conversation history to the client device.

In still yet another embodiment, a computer implemented method of providing a notification service for a conference collaboration tool, the method comprises receiving, by a server, a notification from a client device; writing, by a server, the notification in a database; associating a notification with a conference in the database, wherein the notification is stored on a database and is compiled from at least one attendee or organizer in preparation of the conference and during the conference; retrieving, by a server, the notification associated with the conference from the database; and transmitting, by a server, the notifications associated with the conference to an authorized client device for display on the client device, wherein the authorized client device has permission to view dynamic content associated with the conference as an attendee of the conference or as an organizer.

In another embodiment, a computer implemented method of providing a notification service for a conference collaboration tool, the method comprises retrieving, by a server, all notifications associated with a conference from a database, wherein the notifications are dynamic content stored in the database compiled from at least one attendee or organizer in preparation of the conference and during the conference, and all dynamic content is stored on the database through a method that associates the dynamic content with the conference; and transmitting, by a server, the notifications associated with the conference after a conference to an authorized client device for display on the client device, wherein the authorized client device has permission to view dynamic content associated with the conference as an attendee of the conference or as an organizer In another embodiment, a computer-implemented method for organizing dynamic content in a database of a conference collaboration tool, the method comprises creating, by a server, a record for each of a plurality of conferences in a database; receiving, by a server, dynamic content from a client device in preparation of a conference or during a conference; specifying, by a server, one of the plurality of conferences associated with the received dynamic content; associating, by a server, the received dynamic content with the conference by assigning an event identification key to the received dynamic content, wherein the event identification key references the record for the conference and classifies the received dynamic content with the conference; and storing, by a server, the received dynamic content in the database in the set of dynamic content associated with the conference.

In yet another embodiment, a computer-implemented method for providing dynamic content to a client device from a database of a conference collaboration tool, the method comprises establishing, by a server, a user role of a user interacting with the client device for a conference attended by the user; receiving, by a server, a request from the client device to access a record for a conference, wherein the record is a set of the dynamic content on the database relating to the conference; determining, by a server, the user role of the user interacting with the client device that is requesting access to the record in response to the request to access the record; and verifying, by a server, that the client device has permission to access the requested record by accessing the record for the conference in the database and determining user permissions associated with a user role for the conference.

In another embodiment, a system for organizing dynamic content in a database of a conference collaboration tool comprises a server configured to: create a record for each of a plurality of conferences in a database; receive dynamic content from a client device in preparation of a conference or during a conference; specify one of the plurality of conferences associated with the received dynamic content; associate the received dynamic content with the conference by assigning an event identification key to the received dynamic content, wherein the event identification key references the record for the conference and classifies the received dynamic content with the conference; and a database configured to store the received dynamic content in the set of dynamic content associated with the conference.

In another embodiment, a system for providing dynamic content to a client device of a conference collaboration tool comprises a database configured to store a plurality of dynamic content according to one of a plurality of conferences by storing the dynamic content associated with the conference using a record and by assigning an event identification key to the dynamic content associated with the conference that references the record; a server configured to: establish a user role of a user interacting with the client device for a conference attended by the user and saving the user role in the record; receive a request from the client device to access the record for the conference; determine the user role of the user interacting with the client device that is requesting access to the record in response to the request to access the record; and verify that the client device has permission to access the requested record by accessing the record for the conference in the database and determining user permissions associated with a user role for the conference.

In still yet another embodiment, a computer implemented method of generating a page view of a conference collaboration tool, the method comprises receiving, by a server, a request from a client device for a page view and dynamic content compiled in preparation to a conference or during a conference; determining, by a server, a type of client device requesting the page view and dynamic content; retrieving, by a server, the page view and dynamic content from a database; and formatting, by a server, the page view and dynamic content according to the type of client device, wherein the server formats the page view and dynamic content according to the type of client device after the client device requests the page view and dynamic content from the server.

In another embodiment, a system for generating a page view of a conference collaboration tool comprises a master view controller configured to: receive a request from a client device for a page view and dynamic content compiled in preparation to a conference or during a conference; determine a type of client device requesting the page view and dynamic content; retrieve the page view and dynamic content from a database; and format the page view and dynamic content according to the type of client device, wherein the master view controller formats the page view and dynamic content according to the type of client device after the client device requests the page view and dynamic content from the master view controller.

In another embodiment, a computer implemented method of generating a navigation interface for a conference collaboration tool, the method comprises determining, by a server, a type of client device requesting a page view and dynamic content from the server; retrieving, by a server, a plurality of services associated with a conference; formatting, by a server, a navigation table including interactive links to the plurality of services according to the determined type of device; determining, by a server, whether a navigation bar and a menu button are to be displayed on the client device according to the determined type of client device; determining, by a server, whether one of the service page views is to be displayed with the navigation table on a screen of the client device according to the determined type of client device, wherein the service page view is an area of the screen for displaying dynamic content associated with one of the services, links to other services, or interactive buttons for interacting with the service depending on which service is being displayed by the service page view; and formatting, by a server, the service page view positioned next to the navigation table on the screen of the client device according to the determined type of device if the server determines that the service page view is to be displayed.

In yet another embodiment, a system for generating a navigation interface for a conference collaboration tool comprises a master navigation controller configured to: determine a type of client device requesting a page view and dynamic content from a server; retrieve a plurality of services associated with a conference; format a navigation table including interactive links to the plurality of services according to the determined type of device; determine whether a navigation bar and a menu button are to be displayed on the client device according to the determined type of client device; determine whether one of the service page views is to be displayed with the navigation table on a screen of the client device according to the determined type of client device, wherein the service page view is an area of the screen for displaying dynamic content associated with one of the services, links to other services, or interactive buttons for interacting with the service depending on which service is being displayed by the service page view; and format the service page view positioned next to the navigation table on the screen of the client device according to the determined type of device if the master navigation controller determines that the service page view is to be displayed.

In yet another embodiment, a computer implemented method for managing dynamic controls, the method comprises determining, by a server, that a dynamic content object referencing dynamic content stored in a database has been created, wherein a dynamic content object requires the server to reload or update a page view when the object is selected by a user; assigning, by a server, a unique dynamic control identification to the dynamic control object, wherein the dynamic control identification includes a navigation pointer to the dynamic content stored in the database and referenced by the dynamic control object, and the dynamic control identification also includes information describing a type of page view to generate for the dynamic content when the dynamic content object is selected; and storing, by a server, the dynamic control identification in a database under a conference.

In still yet another embodiment, a computer implemented method for managing dynamic controls, the method comprises generating, by a server, a page view including dynamic content objects referencing dynamic content stored in a database, wherein a dynamic content object requires the server to reload or update a page view when the object is selected by a user; assigning, by a server, a unique dynamic control identification to all dynamic control objects included in the page view, wherein the dynamic control identification includes a navigation pointer to the dynamic content stored in the database and referenced by the dynamic control object, and the dynamic control identification also includes information describing a type of page view to generate for the dynamic content when the dynamic content object is selected; and associating, by a server, each unique dynamic control identification with a conference by storing each dynamic control identification in the database using a record that references the conference; and deleting, by a server, the assigned dynamic control identifications when a new page view is generated.

In another embodiment, a system for managing dynamic controls comprises a server configured to determine that a dynamic content object referencing dynamic content stored in a database has been created, wherein a dynamic content object requires the server to reload or update a page view when the object is selected by a user; assign a unique dynamic control identification to the dynamic control object, wherein the dynamic control identification includes a navigation pointer to the dynamic content stored in the database and referenced by the dynamic control object, and the dynamic control identification also includes information describing a type of page view to generate for the dynamic content when the dynamic content object is selected; and store the dynamic control identification in a database under a conference.

In yet another embodiment, a system for managing dynamic controls comprises a server configured to: generate a page view including dynamic content objects referencing dynamic content stored in a database, wherein a dynamic content object requires the server to reload or update a page view when the object is selected by a user; assign a unique dynamic control identification to all dynamic control objects included in the page view, wherein the dynamic control identification includes a navigation pointer to the dynamic content stored in the database and referenced by the dynamic control object, and the dynamic control identification also includes information describing a type of page view to generate for the dynamic content when the dynamic content object is selected;

and associate each unique dynamic control identification with a conference by storing each dynamic control identification in the database using a record that references the conference; and delete the assigned dynamic control identifications when a new page view is generated.

In another embodiment, a computer implemented method comprises authenticating, by a server, a client device during a conference; receiving, by a server, a request from the client device; executing, by a server, a server side script engine to generate page views and dynamic content compiled in preparation of a conference and during a conference for a client device that is connected to the server through a network; sending, by a server, a hypertext transfer protocol (HTTP) response to the client device to render the page views and dynamic content on the client device during the conference, wherein the HTTP response includes a call to a client side script engine configured to generate a user interface and generate a response to the server; receiving, by a server, the response from the client side script engine; and translating, by a server, the client side script engine response into a command recognized by the server side script engine.

In yet another embodiment, a computer implemented method, comprises authenticating, by a server, a client device during a conference; receiving, by a server, a request from the authenticated client device; executing, by a server, a server side script engine to generate page views and dynamic content compiled in preparation to a conference and during a conference for a client device that is connected to the server through a network; sending, by a server, a hypertext transfer protocol (HTTP) response to the client device to render the page views and dynamic content on the client device during the conference, wherein the HTTP response includes a call to a client side script engine configured to monitor client-side actions and generate a response to the server; translating, by a server, the client side script engine response into a command recognized by the server side script engine.

In still yet another embodiment, a system comprises a server configured to: authenticate a client device during a conference; receive a request from the authenticated client device; execute a server side script engine to generate page views and dynamic content compiled in preparation of a conference and during a conference for a client device that is connected to the server through a network; send a hypertext transfer protocol (HTTP) response to the client device to render the page views and dynamic content on the client device during the conference, wherein the HTTP response includes a call to a client side script engine configured to generate a user interface and generate a response to the server; receive the response from the client side script engine; and translate the client side script engine response into a command recognized by the server side script engine.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, -well-known or conventional details are not described in order to provide a concise discussion of embodiments of the present invention. Therefore, specific structural and functional details disclosed herein are not to he interpreted as limiting, but merely as a basis for the claims and as a representative basis for teaching one skilled in the art to variously employ the present invention in virtually any appropriately detailed structure.

The exemplary embodiments discussed herein recite the use of methods and systems at a conference, though it is intended that the conference can be any job fair, networking event, conference, symposium, seminar, forum, meeting, one-on-one meeting, group presentation, or any other event where people gather and desire to exchange information. Turning now to the drawings, in which like numerals represent like (but not necessarily identical) elements throughout the figures, exemplary embodiments of the present invention are described in detail.

Figure 1:
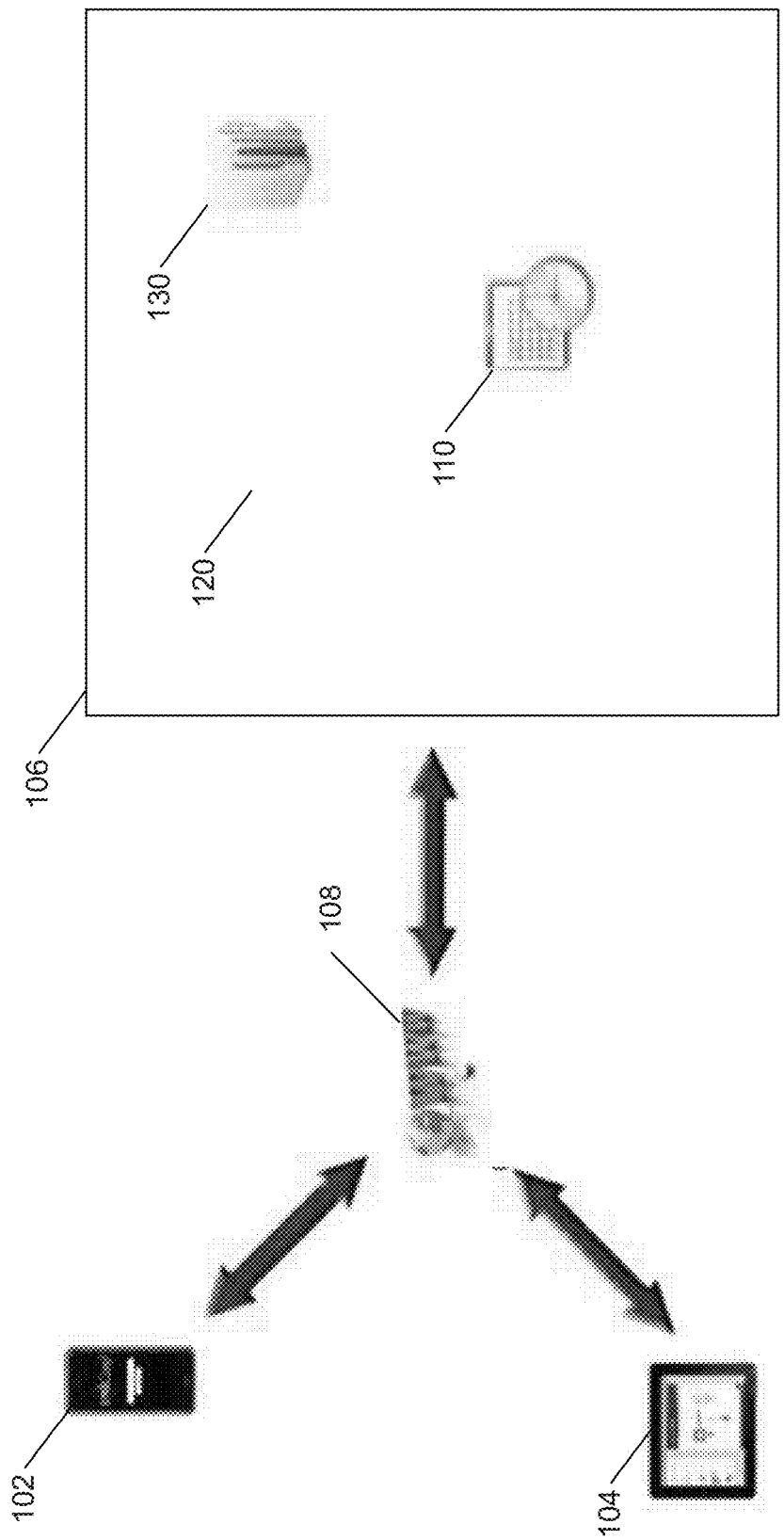
FIG. 1 illustrates a system diagram of the conference collaboration tool according to an exemplary embodiment.
Figure 2:
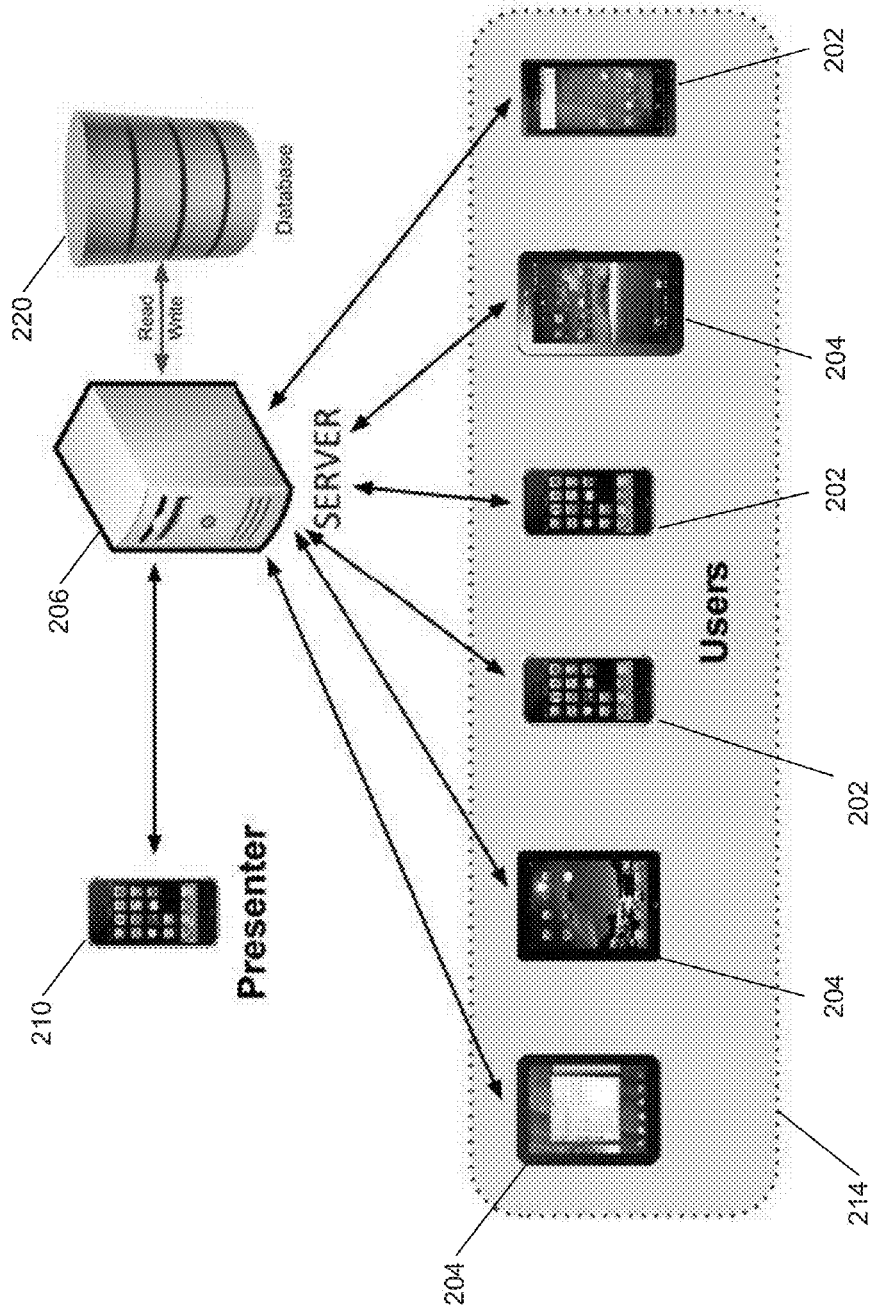
FIG. 2 illustrates a system diagram of the conference collaboration tool including user roles according to an exemplary embodiment.

FIGS. 1 and 2 illustrate a system diagram of a conference collaboration tool. As shown in FIG. 1, a plurality of client devices 102, 104 communicate with a server 106. The server 106 is preferably a web server, but the server may be embodied by any network server. The server 106 can have one or more modules used to execute a particular function of the server 106. In addition, the server 106 may include a workstation and additional components to manage the server 106, however, for illustration purposes, the server 106 is shown as one component. The server 106 receives information and requests from the client devices 102, 104 and sends information to the client devices 102, 104. The mobile client devices may include a smart phone 102 and a tablet computer 104, but a desktop computer, another server, a laptop computer, a PDA, or any other device that is capable of connecting to a network may also communicate with the server 106. The inherent benefits, such as portability, size, weight, and flexibility of smart phones and tablets makes them preferable for the conference collaboration tool of the exemplary embodiments. FIG. 1 illustrates four client devices 102, 104 connected to the server 106, but the number of client devices 102, 104 connected to the server 106 may increase or decrease depending on the size of a conference and attendee demand. The server 106 and the client devices 102, 104 communicate through a network 108, such as a local area network, a wide area network, a high bandwidth internet connection, or a cellular or other mobile carrier network, such as a 3G or 4G cellular network.

The server 106 provides services 110, 120, 130 that are offered as part of the conference collaboration tool. FIG. 1 illustrates three services provided by the server 106: a scheduling service 110, a chat service 120, and a document service 130. The services 110, 120, 130 are exemplary, and FIG. 1 does not show all of the services that can be provided by the server 106. For example, the server 106 may also provide a notification service to determine whether notifications should be sent to any of the devices 102, 104, a presentation service to display presentation slides, a settings service to change the settings of the conference collaboration tool, an administration service for system administration, an attendance service for marking attendance at a conference, or a question queue service to notify the speaker that an attendee has a question. A plurality of other services that may be useful for conference interactivity may also be included in the conference collaboration tool.

As shown in FIG. 2, the server 206 interfaces with a database 220, such as an SQL, OQL, or XQuery database. Information about the services is stored in the database 220. The information stored in the database 220 may be a plurality of page views associated with the services and dynamic content that fills content tables within the page views. The page views may be classified into a plurality of page view types such as a main menu, service page views, and sub-views, and a number of service page views matches a number of the services. The page views will be described in greater detail below. The dynamic content is information that can change in response to information sent from a device 202 or 204. Because the conference collaboration tool provides content during live conferences, the dynamic content is compiled in preparation to a conference or during an event.

The database 220 is partitioned according to records for each of a plurality of conferences. A record is an allocation of the database 220 directed to a conference, meeting, seminar, forum, or any other type of event listed above. The database 220 may contain information regarding multiple records, and an attendee must specify a conference to view, for example, the conference the attendee is attending, before receiving any page views or dynamic content from the server 206.

Figure 3:
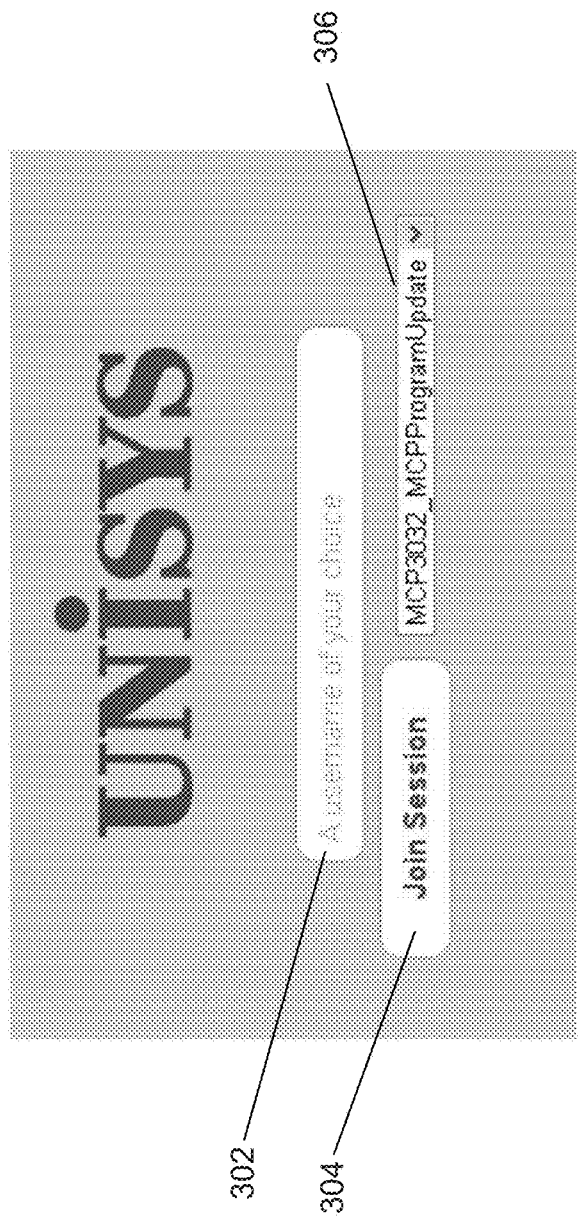
FIG. 3 illustrates a screen shot of a log-in screen for the conference collaboration tool according to an exemplary embodiment.

A conference may be selected at a user log-in screen, such as the log-in screen illustrated in FIG. 3. As shown in FIG. 3, a username text box 302, a join session button 304, and a conference menu 306 are illustrated. When a user accesses the conference collaboration tool, the user may first see the log-in screen of FIG. 3. The user enters in a username in the username text box 302 and selects a conference from the conference drop down menu 306. In some embodiments, the log-in screen of FIG. 3 further includes a password text box. For example, the log-in screen for presenters and the log in screen for attendees may be a different URL so that an attendee does not have access to managerial level conferences, or other higher level, unauthorized conferences. The conference menu 306 may list all of the conferences in session or all conferences scheduled and saved in the database. Once the conference is specified from the conference menu 306, a user attempts to access the conference by pressing the join session button 304. If the username has access to the conference, the server allows access and sends page views and dynamic content regarding the selected conference. A user may access another conference, if the username has permission to view more than one conference, by logging out of the conference and logging-in to a new conference. Alternatively, a link to other conferences may be provided in a page view.

As stated above, the services 110, 120, 130 can be conference-centric. Thus, all dynamic content stored in the database for the services 110, 120, 130 can also be conference-centric. In other words, all dynamic content can be associated with a particular conference. To accomplish this conference-centric navigation, the server 106 may partition dynamic content stored in the database by conference.

Figure 4:
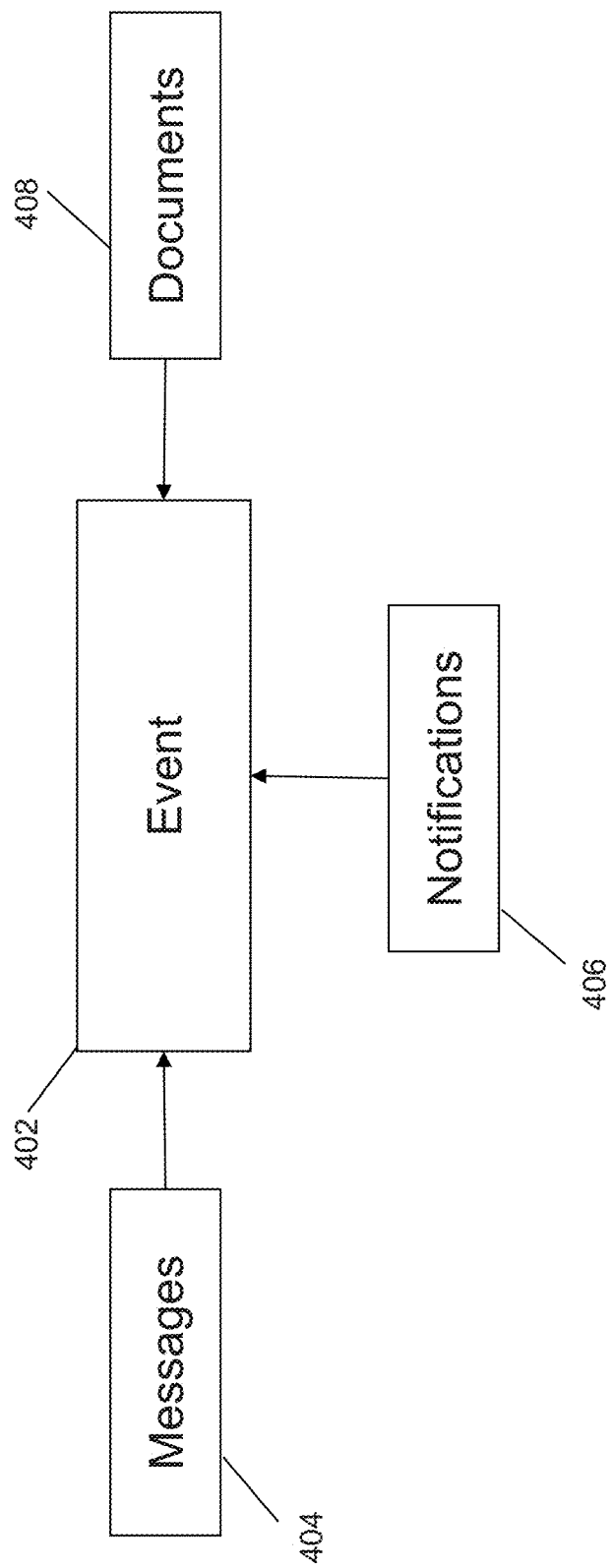
FIG. 4 illustrates an event centric database organization according to an exemplary embodiment.

As shown in FIG. 4, dynamic content for each service is organized by a conference 402. The conference 402 is associated with dynamic content for a messages service 404, dynamic content for a notifications service 406, and dynamic content for a documents service 408. The dynamic content 404, 406, 408 may be associated with the conference 402 by assigning an event identification key to the dynamic content 404, 406, 408. The server may look up dynamic content 404, 406, 408 for a service in the database by first accessing the conference 402 to determine the event identification key, and the server references dynamic content for the services using the event identification key. The server also accesses the conference 402 to determine the event identification key before saving any updated or new dynamic content. If the device provides new dynamic content to a service, the server updates the dynamic content in the database according to the conference 402 and sends the updated information to all the devices connected to the server and requesting information about the conference 402.

In addition, the number of services that exist for a conference can be determined by conference. For example, a survey service page view is not included in FIG. 4. In another conference, a survey page view may be included. Furthermore, a user may create a survey during the conference associated with the conference 402. If a new service is created by a user, the server creates the service in the database and associates the newly created service with the conference 402 by assigning the newly created service the event identification key for the conference 402. Thus, all services, page views, and dynamic content is organized in the database according to a conference.

Referring again to FIG. 2, the database 220 may also store user credentials. User credentials may be used by the server 206 to determine user roles and whether a device 202, 204 may access a conference, if the device 202, 204 cannot access a conference, the server 206 provides no page views or dynamic content about that conference. In one embodiment, the server 206 may send a notification to the device 202, 204 stating that the user credentials do not grant the attendee permission to view that conference if an attendee tries to access the unauthorized conference. In another embodiment, the server 206 may hide unauthorized conferences from the device 202, 204, and the device 202, 204 does not display unauthorized conferences.

FIG. 2 illustrates an implementation of user roles. FIG. 2 shows two distinct roles: a presenter role 210 and a registered users role 214, but the conference collaboration tool may include additional roles, which will be discussed later. The presenter role 210 may include a group of organizers who may include the speaker during the conference and presenter assistants attending the conference to provide support for the speaker, which may mean answering questions or providing technical support. The roles provide different privileges for different services. For example, the presenter 210 may have permission to upload a document to the document service. When the presenter 210 uploads the document, the document may be viewed by the registered users 214. Meanwhile, the registered users 214 may not be able to upload their own files, change uploaded files, or delete the uploaded files from the database 220. Exemplary embodiments may allot the ability to delete, change, or upload a file only to the presenter 210. As can be seen, in some services, the presenter 210 and the registered users 214 have very different privileges.

As another example, the presenter 210 and the registered users 214 may all have the same privileges for another service, such as a chat service 120. In the chat service 120, both the registered users 214 and the presenter 210 can post text and view all posted text. As can be seen, in some services, the registered users 214 and the presenter 210 may have the same basic privileges.

Although FIG. 2 only shows the presenter 210 and registered user 214 roles, additional roles may be included. These roles may include system administrator, guests, and door accounts. A system administrator is a role that shall have access to all privileges and can grant and restrict privileges to any other roles. The system administer shall have the ability to create conferences, delete conferences, grant privileges to user roles, strip privileges to user roles, and any other abilities necessary for system administration and upkeep. A guest is a subset of the attendees, which includes registered users and guests. Guests may log into a conference without a username and password, while registered users 214 have a username and password. Registered uses 214 may have more privileges or the same privileges as guests. Finally, a door account may be a person who is not in attendance at a conference, but instead is outside the conference while the conference is being conducted. The door account user may desire to know information about the conference in session. The door account user has the privileges to log into the conference collaboration tool and see what conferences are in session. Further, the door account user may be able to see a conference description to decide if this conference interests him. Finally, the door account user may be able to send the presenter 210 a notification or message without disturbing the entire conference.

All roles included in the conference collaboration tool may be set to a default level of privileges. However, higher level roles, such as the presenter 210 and the system administrator, may add or remove privileges of lower level roles, such as the guests and registered users 214. Since the system collaboration tool is conference centric, the privileges can change from conference to conference. For example, a first username may have a presenter role 210 in one conference, but a registered user role 214 in another conference. Or, the first username may have all the default privileges of a registered user 214 in one conference, and only some of the default privileges of a registered user 214 in another conference.

The roles are used by the server 106 to decide which page views and what dynamic content a device 102, 104 can access. In other words, a role is an authorization level that the server 106 uses to decide if the device 102, 104 is authorized to view the requested page view or the requested dynamic content. In one embodiment, the server 106 hides any dynamic content or page views that a role is not allowed to access. For example, if a user interacting with the device 102, 104 has a guest role, the device 102, 104 may not be able to upload any documents to the documents service 130, so the upload function of the document service 130 may not be displayed in the document service 130 page view. Whereas, if the user interacting with the device 102, 104 is has a presenter role, and the device 102, 104 has permission to upload any document to the documents service 130, the upload function in the documents service 130 is listed in the document service 130 page view for the presenter.

The user roles may also associate a user with a conference. For example, a user may be able to check into an event, and the server 106 may display the user's attendance, for example in a user profile. User profiles may be accessed as well through the conference companion tool. For example one of the services 110, 120, 130 may be a user list. The user list may list all of the users attending a conference, and the user list may also include a link to each user's profile. The profile may include information such as email address, phone number, job title, social networking credentials, or any other information that may normally be included in a professional profile. In fact, any time a username is listed in any of the services 110, 120, 130, the username may include a link to the user profile. Users may create their profile upon registration. The registration process may include an entry form that allows each user to customize his or her user profile. The registration page may require a user to input an access code as proof that they are registered for the conference, or the registration page may allow user to sign up for additional conferences. For example, the registration process may include suggestions for additional conferences the user can join based on the subject matter of the user's conference, or by analyzing the types of conferences the user has been to in the past.

Figure 5:
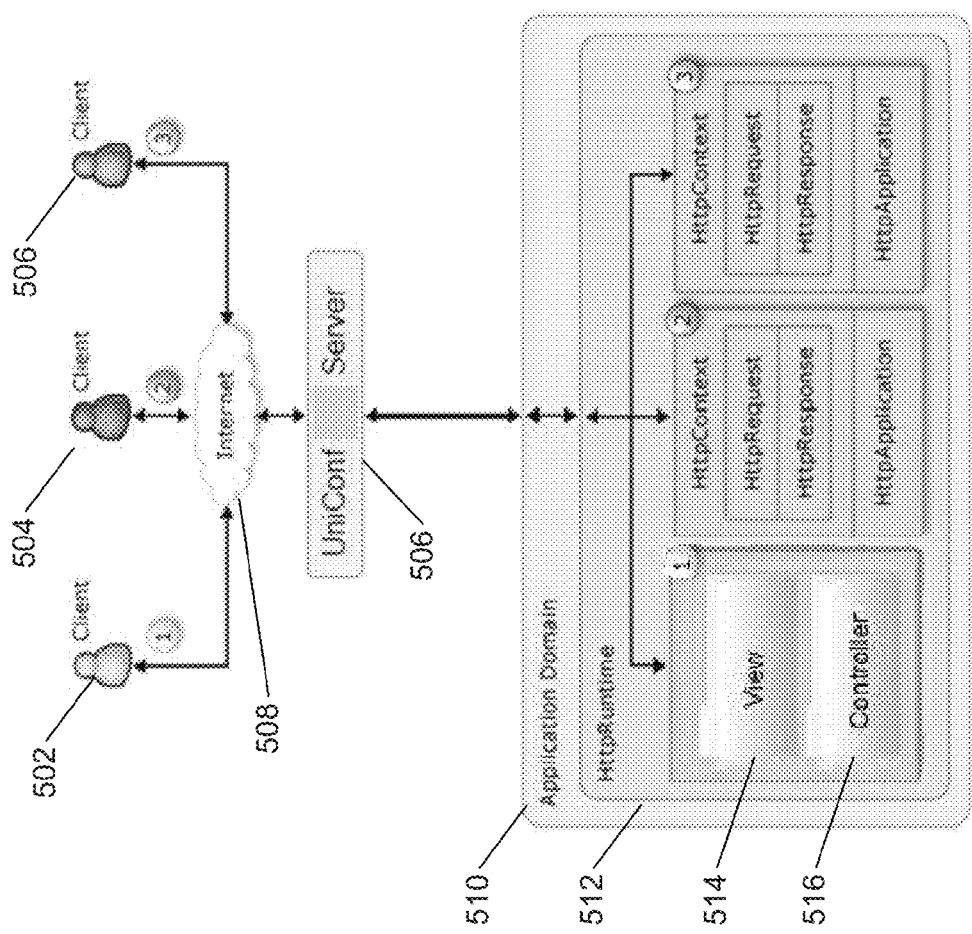
FIG. 5 illustrates the conference collaboration tool being offered as a web service according to an exemplary embodiment.

FIG. 5 illustrates the conference collaboration tool offered as a web service. As shown in FIG. 5, three clients devices 502, 504, 506 are connected to the server 506. The three client devices 502, 504, 506 may be accessing three different conferences, different services within the same conference, or the same service within the same conference. The three client devices 502, 504, 506 are connected to the server 506 through the network 508, which may be the internet. When the conference collaboration tool is offered as a web service, the three client devices 502, 504, 506 may access the server 506 by navigating to a designated web-page. Since the conference collaboration tool is web-based, a client devices 502, 504, 506 access the conference collaboration tool through a web browser. Because the conference collaboration tool can be accessed using a web browser, no additional software applications or "apps" may be required to run the conference collaboration tool.

Because the conference collaboration tool is web-based, the client devices' 502, 504, 506 web browser sends HTTP requests over the network 108 to the conference collaboration tool. The conference collaboration tool may run as a different format than HTTP on the server 506. Thus, the conference collaboration tool may need a server side script engine, such as ASP, JavaScript, Ruby on Rails, or the like, to generate web pages. A server side script engine may be necessary because the information in the services is dynamically generated. Server side script engines are well known in the art, and further explanation is omitted.

The conference collaboration tool includes an application domain 510 and HTTP runtime domain 512. The application domain 510 receives HTTP requests from client devices 502, 504, 506. The application domain 510 may use the server side script engine to handle the requests and send back an HTTP response. The server side script engine uses a controller 516 to handle HTTP requests and send HTTP responses. The controller 516 references and implements the page view, which may be found in the view folder 514, and the dynamic content, which is stored in the database. The controller 516 formats the HTTP response with the appropriate page view and the appropriate dynamic content for that page view. The HTTP response is sent to the client devices 502, 504, 506, and the client devices 502, 504, 506 see the proper page view and dynamic content on their device when the device's web browser loads the page using the HTTP response. The functions and processes of the controller 516 is further described with reference to FIG. 6.

Figure 6:
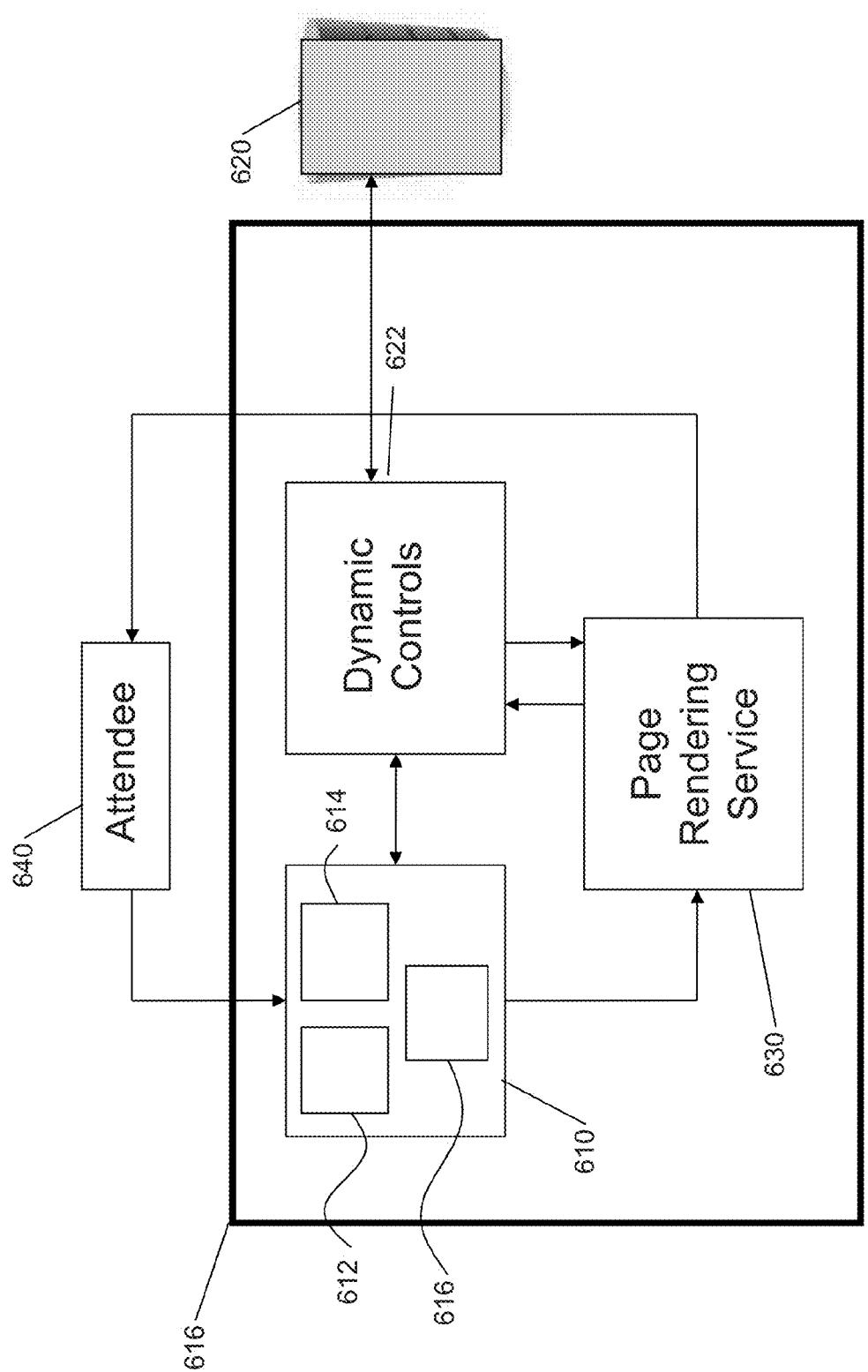
FIG. 6 illustrates a block diagram of a controller of the conference collaboration tool according to an exemplary embodiment.

FIG. 6 illustrates components of a controller 616 of the conference collaboration tool. The controller 616 of the conference collaboration tool includes a navigation controller 610, a dynamic controls module 622, and a page rendering service 630.

The navigation controller 610 is configured to format the page views and dynamic content to a screen of a particular device and to track navigation through a hierarchy of page views. The navigation controller 610 includes a master navigation controller 612, a master view controller 614, and a navigation tracker 616. Both the master navigation controller 612 and the master view controller 614 are capable of determining the type of device requesting information from the conference collaboration tool. For example, the detected type of device may be generic, such as a tablet, a smart phone, or a personal computer, or the type of device may be more specific, such as a manufacturer and a model of the device. The master navigation controller 612 and the master view controller 614 may be further capable of determining the operating system or the browser type that the device.

The master navigation controller 612 is configured to format a navigation interface in response to the determined device type, and the master view controller 614 is configured to format a page view and dynamic content in response to the determined device type. The master view controller 614 and the master navigation 612 controller may further format the page views, dynamic content, and the navigation interface in response to a browser type, an operating system type, or any other device characteristics that affects how content is displayed on a screen of the device. The master navigation controller 612 may also format the navigation interface according to the determined device type. The navigation interface may include a navigation table, a navigation bar, if necessary, or a page view window displayed with the navigation table. For example, if a tablet is requesting information from the conference collaboration tool, the master navigation controller 612 formats the screen for a tablet. Alternatively, if a smart phone is requesting information from the conference collaboration tool, the master navigation controller 612 formats the navigation interface for a smart phone, which may be different than the tablet view because of the inherent limitations in size and screen area.

Figure 7:
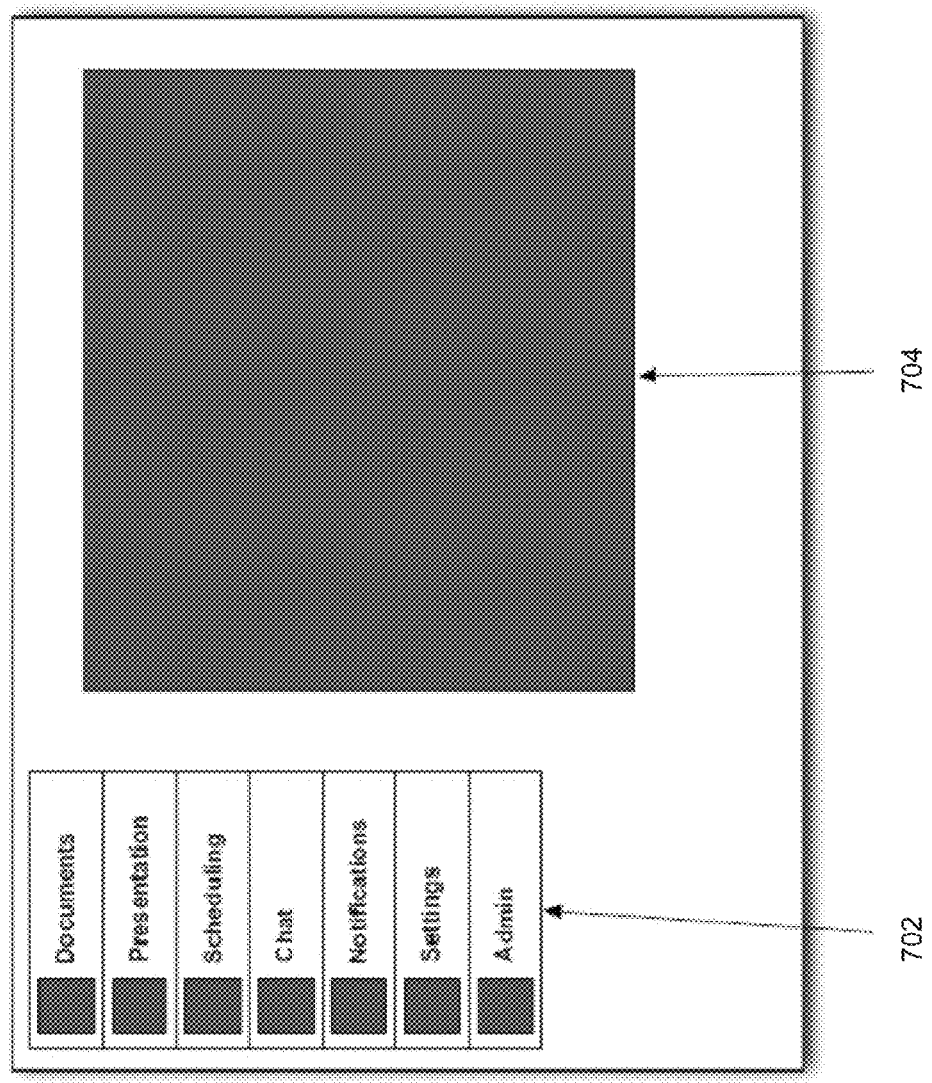
FIG. 7 illustrates a tablet screen view according to an exemplary embodiment.
Figure 8:
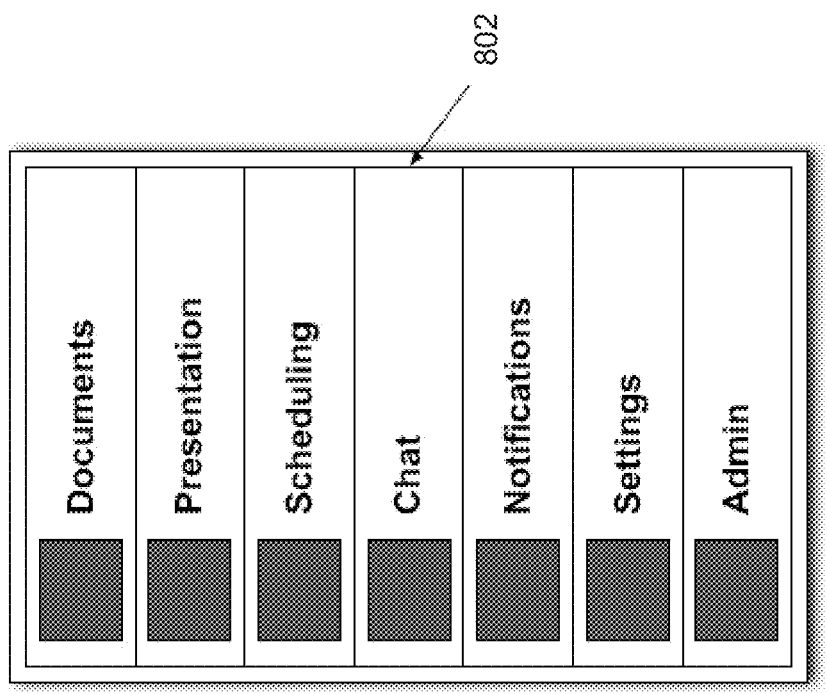
FIG. 8 illustrates a smart phone screen view according to an exemplary embodiment.

Exemplary navigation interfaces are illustrated with reference to FIG. 7 and FIG. 8. In the exemplary embodiment, FIG. 7 illustrates a tablet screen view, and FIG. 8 illustrates a smart phone screen view. In FIG. 7, a navigation table 702 may appear on the left side of the page, and a service page view placeholder 704 may appear to the right of the navigation table 702. For example, if the attendee has selected the presentation service from the navigation table 702, the presentation service page view is displayed in the service page view placeholder 704. In the tablet view of FIG. 7, the navigation table 702 may always appear on one side of the screen, and the service view placeholder 704 changes as an attendee selects different services from the navigation table 702. The service page view placeholder 704 may also display a sub-view within the service page view placeholder 704 if a link to a sub-view is selected by the attendee. Also, since the navigation table 702 is always displayed on the screen of the device, additional navigation interfaces, such as a navigation bar or a main menu button, may not be included. Displaying both the navigation table 702 and the service page view placeholder 704 may not be appropriate for all tablets, and the master navigation controller may include only the navigation table 702 or only the service page view placeholder 704 if a particular type of tablet cannot comfortably display both the navigation table 702 and the service page view placeholder 704.

In the smart phone view of FIG. 8, the enter user interface may be used for a navigation table 802. If an attendee selects one of the services listed on the navigation table 802, a service view may replace the navigation table 802, and the entire screen may be reloaded to display the service page view, as described with respect to FIG. 9. In the smart phone view shown in FIG. 8, additional navigation interface portions may be included. For example, a navigation bar (not illustrated), which may include a back button or the main menu button, may be always included at a top portion of the screen. The master navigation controller determines if the back button or the main menu button or any other navigation interface portions are to be included according to the type of device. As illustrated by FIGS. 7 and 8, the type navigation interface can change depending on the type of device.

The navigation controller 610 calls the master navigation controller 612 when the navigation interface is to be generated on the screen. The navigation interface may be generated on the screen when the attendee 640 first logs into the conference, when a main menu button is pressed by a user, every time a new page view is loaded, and a plurality of other conferences that require the navigation interface to be generated.

Figure 10:
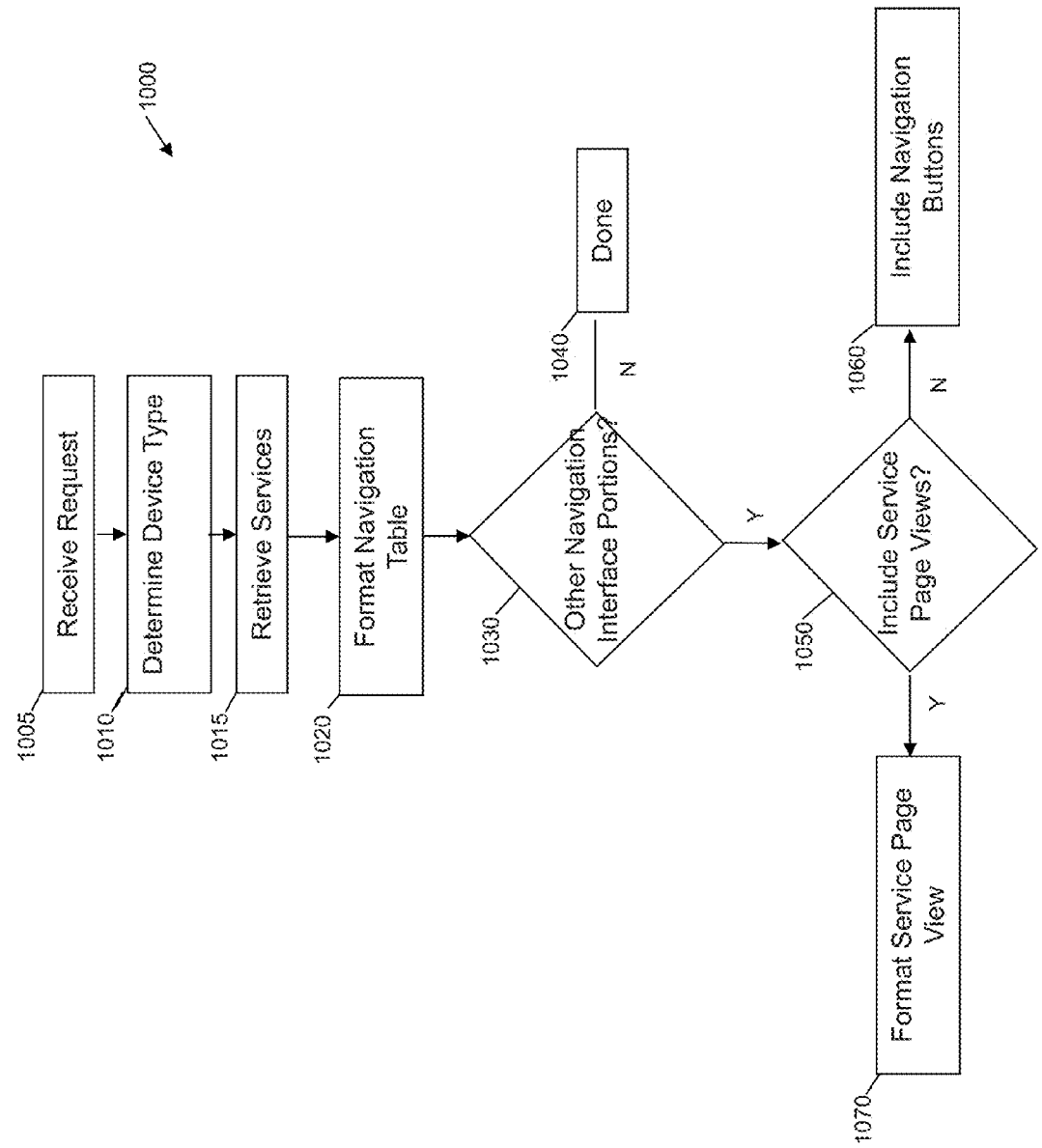
FIG. 10 is a flow chart illustrating the method of a master navigation controller according to an exemplary embodiment.

The operation of the master navigation controller is illustrated with reference to FIG. 10. If the master navigation controller is called by the navigation controller when a request is received in step 1005, the master navigation controller determines the type of device that is requesting information in step 1010. The master navigation controller may determine the type of device by reviewing the HTTP requests from the device, or having a user specify the device type, or by determining the type of browser used to access the conference companion tool, or any other method that hints at the device type. In step 1015, the master navigation controller retrieves the list of services offered for the conference from the database. Subsequently, the master navigation controller formats the navigation table according to the type of device in step

1020. After the navigation table is formatted, the master navigation controller determines whether additional navigation interface portions are to be generated and formatted according to the device in step 1030. If no additional navigation interface portions are to be include, the master navigation controller finishes in step 1040. If additional navigation interface portions are to be included, the master navigation controller checks if a service page view is to be displayed along side the navigation table, like in the tablet example in FIG. 7, in step 1050. If the service page view is to be displayed, the master navigation controller formats the service page view size according to the device type in step 1070. If the service page view is not to be displayed, the master navigation controller formats the additional navigation interface portions, such as the menu button or the back button, according to the device in step 1060.

The master navigation controller 612 can format the navigation interface according to the device type using the stored multiple navigation interfaces in the database. Each conference may list the number of services, and each type of device may have a different navigation interface, and the master navigation controller 612 formats the navigation interface to include all of the services for that conference according to the type of device.

The navigation controller 612 may utilize responsive design and server side components (RESS), for example, as described in "RESS: Response Design+Server Side Components" by Luke Wroblewski (Wroblewski, Luke, "RESS: Responsive Design+Server Side Components," Ideation+Design, published Sep. 12, 2011) and "Getting Started with RESS" by Anders M. Anderson (Anderson, Anders M., "Getting Started with RESS," Net Magazine, published May 9, 2012), both of which are incorporated by reference in their entirety.

The master view controller 614 is called by the navigation controller 610 each time a service page view or a sub-view is to be displayed on the screen of the device. A service page view is displayed on the screen when the attendee 640 selects a service from the navigation table or selects a link to another service or to a sub view from a service page view.

Figure 11:
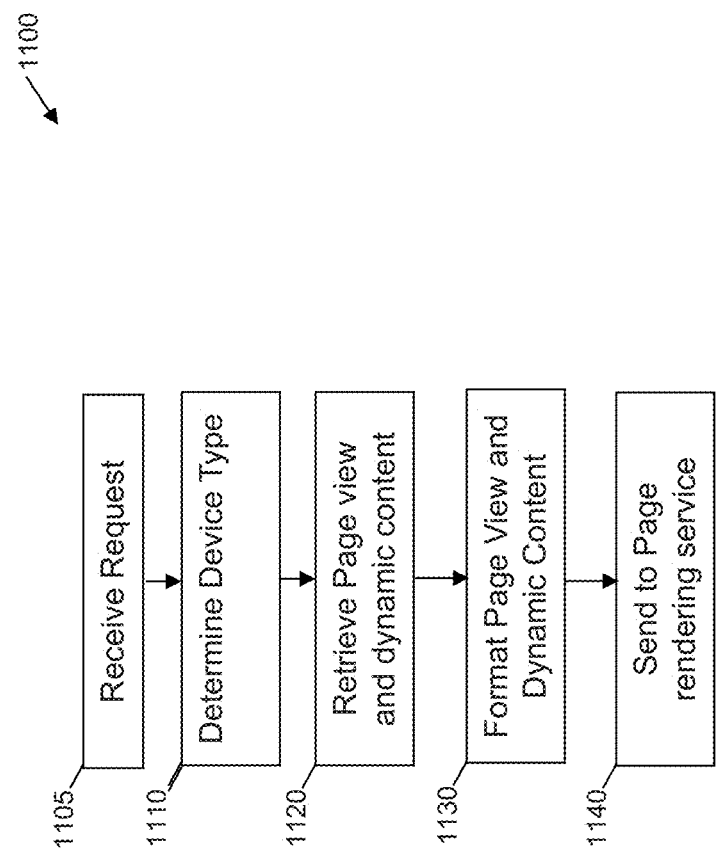
FIG. 11 is a flow chart illustrating the method of a master view controller according to an exemplary embodiment.

The operation of the master view controller is illustrated with reference to FIG. 11. If the master view controller is called by the navigation controller by receiving a request at step 1105, the master view controller determines the type of device that is requesting information in step 1110. The master view controller retrieves the service page view and the dynamic content from the database in step 1120. The master view controller formats the service page view and the dynamic content within the service page view to appropriately display on the device according to the type of device in step 1130. A service page view or a sub-view may include a number of tables, lists, or images, and the master view controller formats the content of the service page view or sub-view appropriately according to the type of device determined by the master view controller. For example, if a tablet requests a service page view, the master view controller may format the text to be a different font, or may stretch an image to a larger dimension. Once the service page view and the dynamic content is formatted, the master view controller sends the formatted service page view and dynamic content to the page rendering service.

Figure 9:
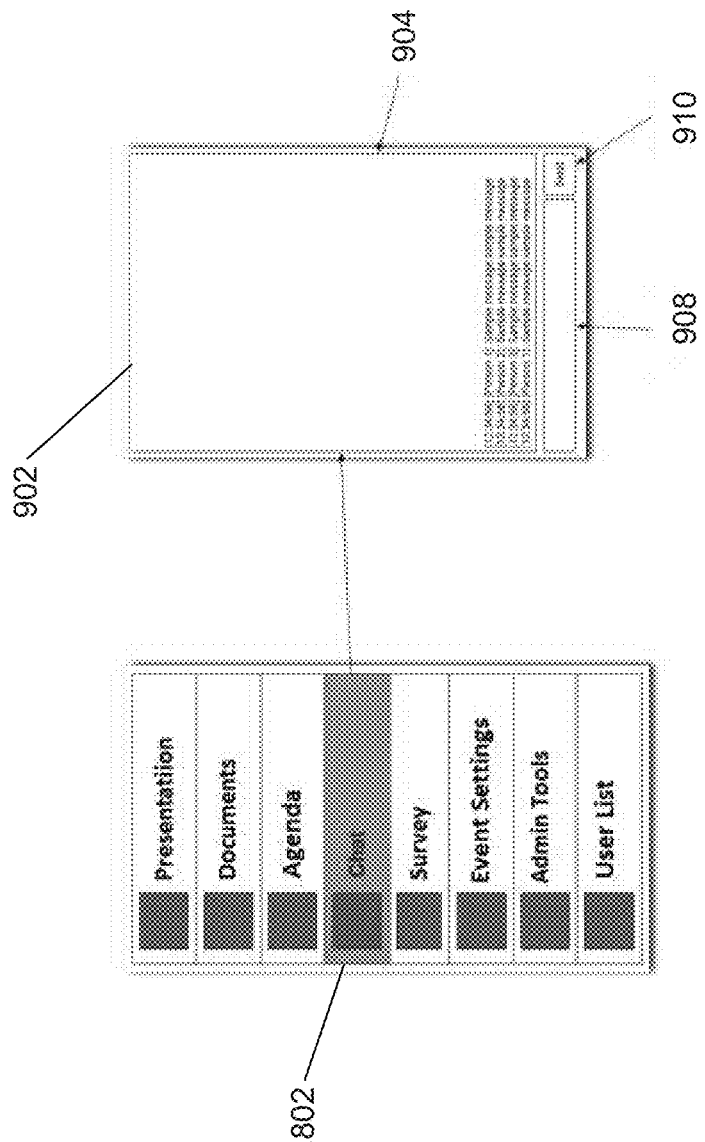
FIG. 9 illustrates a service page view according to an exemplary embodiment.

For example, FIG. 7 shows the service page view placeholder 704 shown on a tablet to be substantially square in shape. Alternatively, FIG. 9 shows a chat service page view, which may be more rectangular in shape. Because of the differences in screen shape and size, the master view controller formats the service page view to be viewed in a user-friendly manner no matter what type of device is displaying the service page view.

If a sub-view within a service page view is selected by the attendee 640, the master view controller 614 also formats the sub-view according to device type. Also, like the master navigation controller 612, the conferences stored in the database do not store multiple service page view for multiple devices. Instead, the database stores the set of services included in the conference, and any dynamic content associated with the conference, and the master view controller 614 formats the dynamic content and page views according to device. Thus, redundant data does not have to be stored in the database. Instead, one set of information, which include dynamic content and service page views, stored under the conference is stored in the database, and that set of information is formatted according to device type.

The navigation controller 610 can also include a navigation tracker 616 that provides for navigation through the page views. The page views may include the main menu, the service page views, and the sub-views. The navigation of the page views may behave like a hierarchy tree. For example, within a conference, the attendee 640 may first be directed to the main menu, which lists the services available for the conference according to the attendee's role, after logging in. After an attendee 640 selects a service, the navigation controller 610 calls for a service page view of the selected service.

To track the navigation through the page views, the navigation tracker 616 may assign static control ID's for the page views. By using static control IDs, the navigation controller 610 is able to determine which page view of the hierarchy the attendee 640 is currently viewing. The navigation controller 610 does not store the current page view of all client devices in the database. Doing so may be impractical for all client devices connected to the server. Thus, the navigation controller 610 can determine the current page view of the device by looking at the static control ID of the page view.

The dynamic controls module 622 manages dynamic content and control IDs associated with the dynamic content. As discussed above, the navigation controller 610 relies on control IDs to track the navigation through the hierarchy of page views within a conference. In other words, the control ID may act as a navigation pointer pointing the navigation controller 610 to which location to navigate the client device. However, control IDs are assigned to more than just service page views and sub views. More specifically, any object within a page view, including dynamic content, may require a control ID. Objects that require a control ID may be called "controls," such as a text box, a button, or a link, and controls require the page view to be updated or reloaded.

Figure 12:
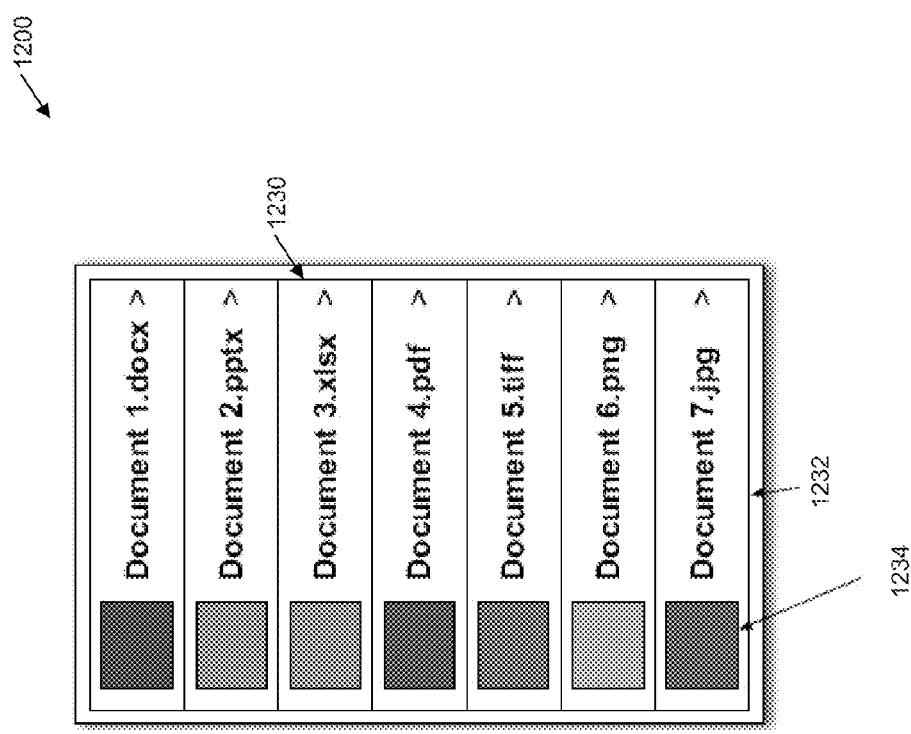
FIG. 12 illustrates a documents service page view according to an exemplary embodiment.

For example, referring to FIG. 12, in the documents service 1200, the documents 1230 for the conference, which are stored on the database, may be listed. Each document 1230 listed may have a document type image 1234 and a document name 1232. Each listed document 1230 is dynamic content because the documents 1230 listed in the documents service 1200 may be updated or removed, or a new document may be added to the list. Each document 1230 listed provides a link to view the document 1230, and a document selected from the list of documents 1230 may be viewed by selecting one of the documents 1230. Once a document is selected, the navigation controller must generate the sub-view and dynamic content to view the selected document 1230. In order to navigate to the correct sub view, the navigation controller relies on a control ID. In this case, the control ID for the document 1230 is not a static ID because the document may be removed. Thus, dynamic control IDs are necessary and must be created whenever a new control is created, and the dynamic controls module manages the dynamic content controls and the assigning of IDs to dynamic content controls.

Figure 13:
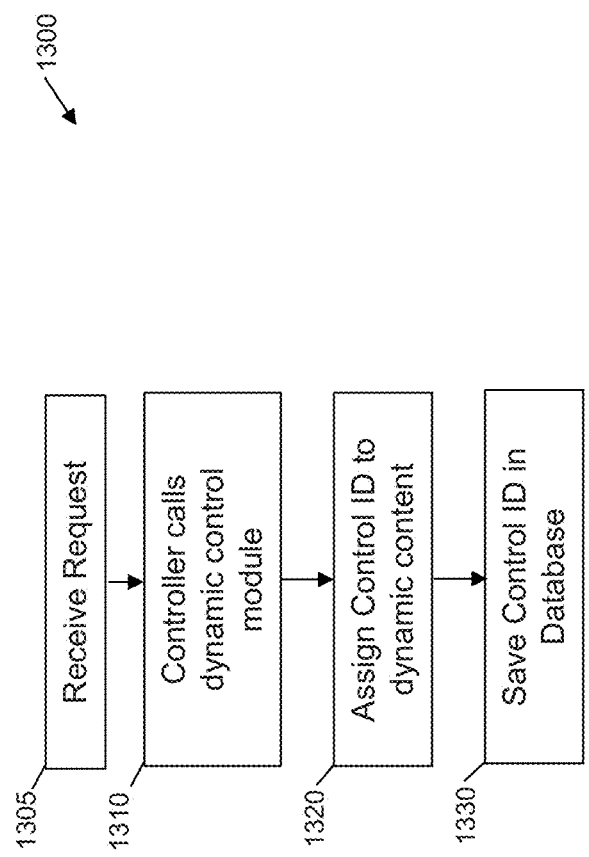
FIG. 13 is a flow chart illustrating the method of a dynamic content controller according to an exemplary embodiment.

Referring to FIG. 13, the procedures of the dynamic controls module are illustrated after a request is received in step 1305. In step 1310, the dynamic controls module is called, which may be whenever a piece of dynamic content is created. In one embodiment, the dynamic controls module may be called to assign dynamic control IDs to controls every time a new page loads. In another embodiment, the dynamic control IDs are saved in the database and remain the same until the dynamic content control is removed. Subsequently, the dynamic control module assigns a dynamic content control ID to the dynamic content control in step 1320. The dynamic control module assigns the dynamic content control a unique ID that is not used by any other control. The dynamic control module assigns the control IDs in a predictable manner and associates the control ID with the dynamic content in the database in step 1330. For example, the predictable manner may include assigning control IDs that contain a reference to the type of service page view or sub view in which the dynamic content is presented.

Returning to the documents service 1200 example of FIG. 12, if a new document 1230 is added to the list by the presenter or any user, the dynamic controls module assigns the new document a dynamic control ID. The dynamic controls module assigns the new document a unique control ID, but also includes a control ID informing the navigation controller to present the new document in a document viewing sub-view. The new document is saved in the database with the associated control ID.

Referring again to FIG. 6, the page rendering service 630 is configured to render a page view for the device upon initial page load and at periodic intervals. For example, when the attendee selects a service from the navigation table or main menu, the page rendering service 630 calls the navigation controller 610 to format the service page view and the dynamic content. The page rendering service 630 may convert the formatted service page view and inserted dynamic content in the HTML language to send to the client device. The page rendering service 630 also renders the page view at periodic intervals. For example, the page rendering service 630 may include a timer. The timer may be set to a specific period, and when the period elapses, the page rendering service 630 reloads the page. When the page rendering service 630 periodically reloads a page, only changes in dynamic content are checked. The page rendering service 630 relies on update panels to provide constant updates to the dynamic content without a visible page load. More specifically, the page rendering service periodically checks the dynamic content of the update panels and check for changes in the update panels. If there is a change to an update panel, the panel is reloaded, but the entire page is not refreshed. For example, the period for the page updates may be set to three seconds, but more or less time may be used for the periodic updates.

The conference collaboration tool may include a number of services 110, 120, 130, as shown in FIG. 1. More specifically, the conference collaboration tool may at least include the chat service 120 and a notifications service. The chat service 120 offers a medium for communication while a conference or meeting is in session. The users in the chat may ask questions or discuss interesting topics while the conference is in session.

FIG. 9 illustrates a service page view 902 of the chat service, in a chat service page view 902, a chat history 904, a text box 908, and a send button 910 are displayed in the service page view of the chat service. These three elements are static to the page view for the chat service. The chat history 904 may list all text stored in the database or just the text included since the attendee started using the chat service. The text box 908 allows the attendee to input text to contribute to the chat service. Lastly, the send button 910 allows the attendee to send the text inputted into the text box 908 to the server.

Figure 14B:
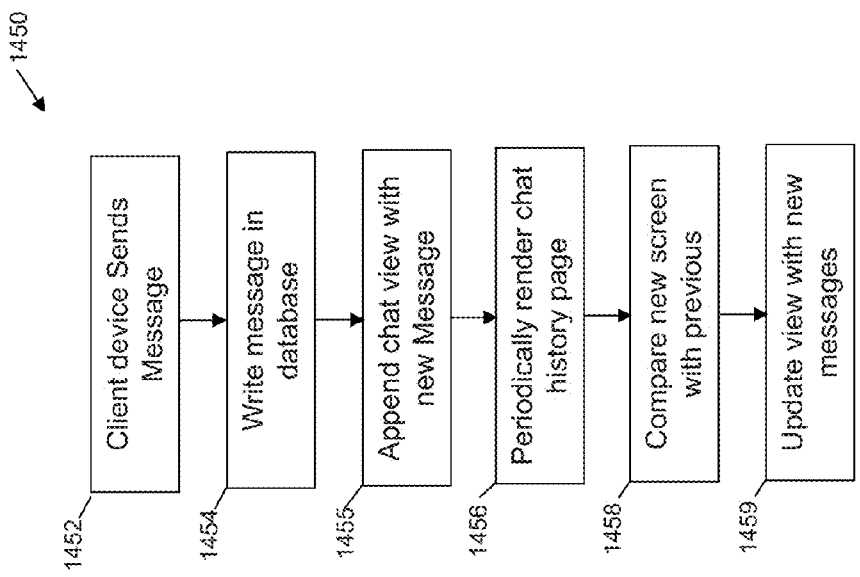
FIGS. 14A and 14B are flow charts illustrating methods of a chat service according to an exemplary embodiment
Figure 14A:
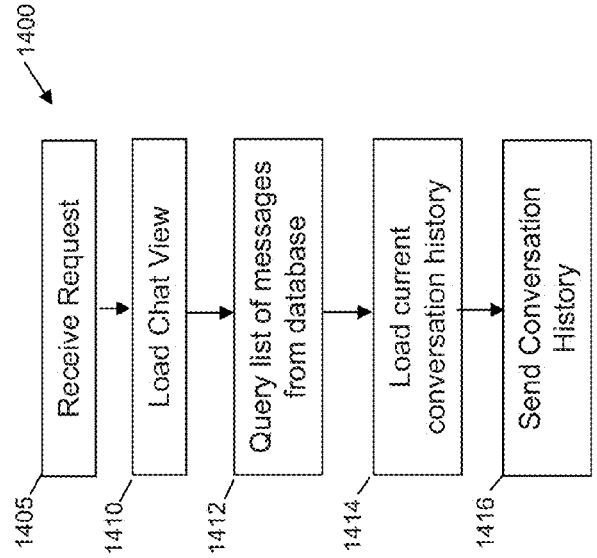

FIGS. 14A and 14B illustrate the method of the conference companion tool that provides the chat service. The chat service includes at least two actions. First, when a user first logs into the chat service, the chat service provides a conversation history of all messages saved to the chat service, which is illustrated by FIG. 14A. Second, the chat service updates the chat service view 902 each time a new message is sent from a client device, which is illustrated by FIG. 14B.

Referring to FIG. 14A, the navigation controller receives a request in step 1405 and loads the chat service view in step 1410. In step 1412, the server asks for the list of messages stored in the database for the conference. The server loads the current conversation history from the database in step 1414, and the server sends all prior messages of the conversation history to the client device in step 1416. The conversation history may be sent to the client device as an HTTP response.

If the client device sends a message, the method of FIG. 14B is performed. First, in step 1452, the user enters a message into the text box and pushes the send button. The server receives the message from the client device and writes the new message in the database in step 1454. The navigation controller appends the chat service view to include the new message sent from the client device in step 1355. In step 1456, the page rendering service periodically updates the service page view, and the previous page displayed on a client device is compared to the updated service page view in step 1.458. As a result of the comparison, certain update panels change to display the new message on all devices in step 1459.

As described above, the page rendering service periodically updates the service page views, including the chat service page view. As a result, the new messages are not pushed to all client devices when a new message is uploaded into the database. Instead, the new messages are periodically updated according to the page rendering service, and the chat service page view is periodically updated if new messages are determined as a result of a comparison with a previous service page view.

The messages viewed in the chat service may all have a time stamp. In addition a name or a username of the user who sent the message may be displayed next to the message. Further, the chat history may label messages according to user roles. For example, messages from a presenter may be displayed in a different color or font than messages from a registered user or a guest.

The notification service presents notifications to users who are subscribed to a conference and allows for notifications to be sent to all or some of the users subscribed to the conference. In one embodiment, only some user roles may send notifications, such as the presenter and the system administrator. In another embodiment, anyone may send a notification. In yet another embodiment, notifications sent by registered users or guests may only be sent to other registered users and guests, while the presenter or system administrator may send a notification to all users logged into the conference.

The notifications may be sent publicly or privately. More specifically, a notification may be sent to only one specific individual or a group of specific individuals, or a notification may be sent to all users subscribed to the conference. For example, a public notification may be sent to all registered users subscribed to the conference to notify the attendees that a conference start time has changed, or to notify attendees that a new survey or document has been created in the survey or document service. A private notification, for example, may be used by the presenter to "call" on someone to answer a question he has asked during the presentation. Notifications may be used in a plurality of ways to alert users of important information.

In addition, the notification service may always run in the background of every service page view and the main menu. If the notification service is running in the background, whenever a new notification is detected by the page rendering service, the client device will receive the notification as a pop-up alert. The pop-up notification may be dismissed or the client device may offer the user the ability to respond to the notification, for example, by providing a link to the chat service.

Figure 15B:
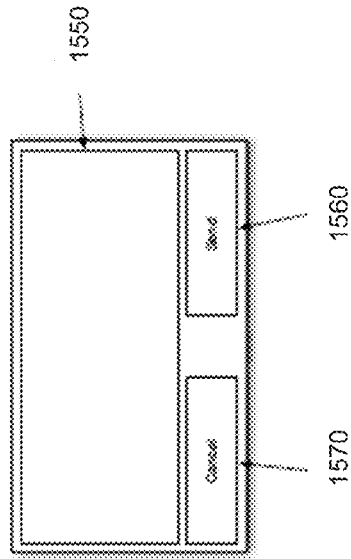
FIGS. 15A and 15B illustrate a notification service page view and a notification service sub-view according to an exemplary embodiment.
Figure 15A:
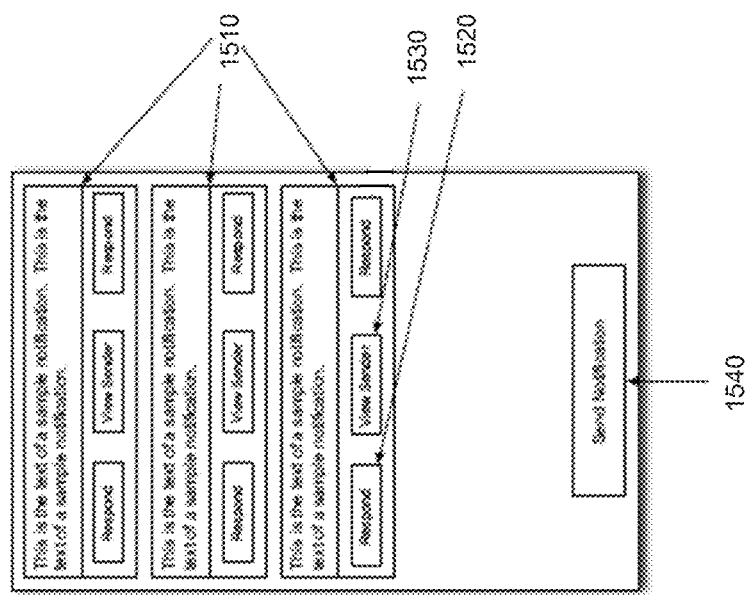

Alternatively, the notification service may have its own service page view that can be entered through the navigation table. An example of the notification service page view is illustrated in FIGS. 15A and 15B. FIG. 15A illustrates the notification service view. The notification service view includes a plurality of notifications 1510, a respond button 1520, a view sender button 1530, and a send notification button 1540. The notifications 1510 may be arranged in order of when they were sent. In another embodiment, notifications 1511) from a presenter or a system administrator may always appear at the top because they are deemed most important. The notifications 1510 may include text, which may include a preview of all the notification text or all of the notification text. The respond button 1520 allows a user to respond to the notification 1510. In one embodiment, the respond button 1520 display the image illustrated in FIG. 15B, and the user may respond to the notification by sending a new notification. In another embodiment, the respond button 1520 loads the chat service, and the user may respond to the notification through the chat service. The view sender button 1530 displays the name or username of the person who sent the notification 1510. In one embodiment, the view sender button provides a link to a profile of the sender, which may include a plurality of information about the sender, such as name, company, phone number, email address, social media pages, or any other information about the sender. The send notification button 1540 provides a link to the notification sub-view shown in FIG. 15B, and allows a user to send a notification. If privileges of some user roles are restricted so that certain roles may not send notifications, the send notification button my be hidden from non-privileged users by the navigation controller. Alternatively, an error message may be displayed to non-privileged users if they attempt to send a notification. The notification sub-view of FIG. 15B includes a text box 1550, a send button 1560, and a cancel button 1570. The text box 1550 allows a user to enter a message. The send button 1560 allows the user to send the notification to the server. Finally, the cancel button 1570 returns the user to the notification service view of FIG. 15A without sending any notifications.

Figure 16B:
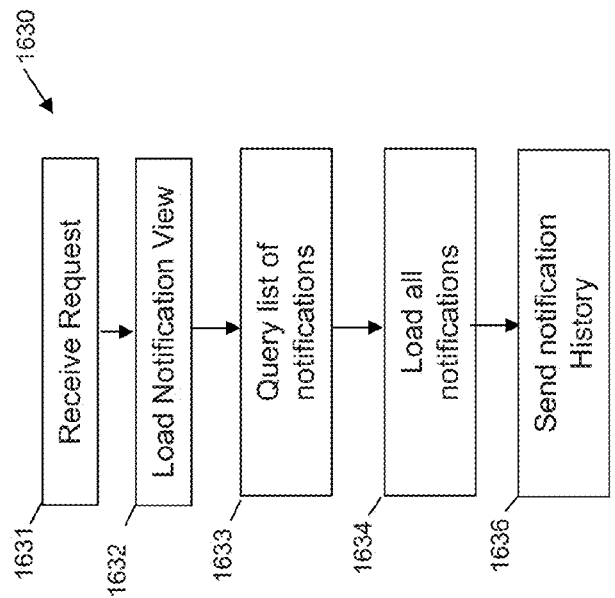
FIGS. 16A and 16B are a flow charts illustrating the method of a notification service according to an exemplary embodiment.
Figure 16A:
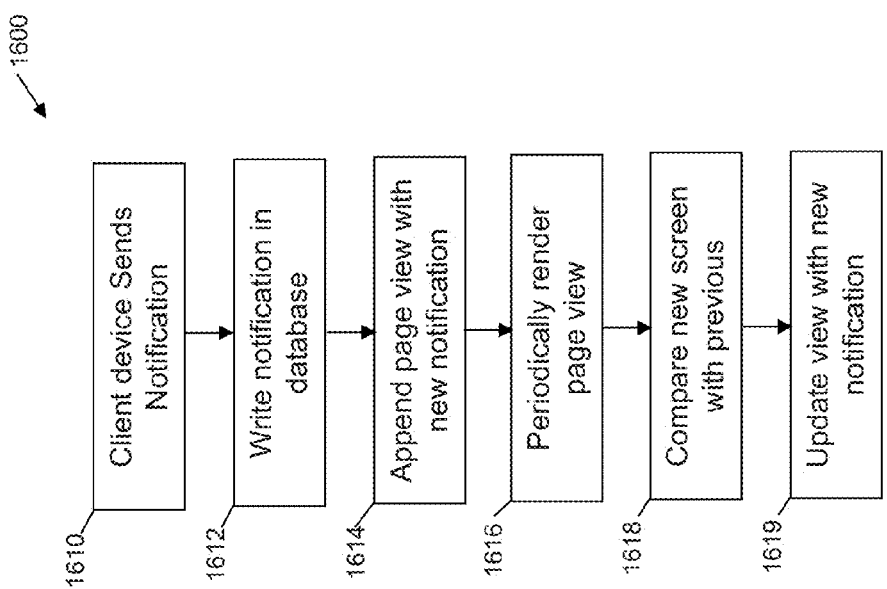

The method of the conference companion tool to provide the notification service is illustrated in FIGS. 16A and 16B. As shown in FIG. 16A, the method 1600 begins in step 1610 where a new notification is sent from a client device. In step 1612, the server 106 receives the message from the client device and writes the new message in the database. The navigation controller appends the page view to include the new notification sent from the client device in step 1614. The page view that is appended in step 1614 may be a notification service page view, or the page view may be any service page view if the notification service runs in the background, in step 1616, the page rendering service periodically updates the service page view, and the previous page displayed on a client device is compared to the updated service page view in step 1618. As a result of the comparison, certain update panels change to display the notification in step 1619. If the notification is sent publicly, all client devices display the notification, but if the notification is sent privately, only the intended recipient client device displays the notification.

The method of FIG. 16B may be performed when a user first logs into the conference or the notification service page view. Referring to FIG. 16B, the navigation controller receives a request in step 1631 and loads the notification service view in step 1632. In step 1633, the server asks for the list of messages stored in the database for the conference. The server loads unread notifications from the database in step 1634, and the server sends all unread notifications to the client device in step 1636. If the notification service runs in the background, the method 1630 may be performed when a user first logs into the conference, and the notification service may be performed while the navigation table is generated. If the notification service runs in the notification service page view, when a user first accesses the notification service page view, the method 1630 may be first performed while the notification service page view is being generated by the navigation controller.

As described above, the page rendering service periodically updates the service page views, including the notification service page view. As a result, the new notifications are not pushed to all client devices when a new notification is uploaded into the database. Instead, the new notifications are periodically updated according to the page rendering service, and the notification service page view is periodically updated if new messages are determined as a result of a comparison with a previous service page view.

As discussed above, the conference collaboration tool may implement a server side script engine to perform the methods discussed above. The server side script engine runs only on the server, and so, the server side script engine cannot be run without a request by the client browser, such as a page refresh. Client side operations implemented into a web browser, such as JavaScript may be included to handle user interfaces and dynamic websites. The conference collaboration tool is able to correlate client side scripts engines, such as JavaScript, with server side script engines using web methods.

The web methods interface the server side script engine with the client side script engine. The client side script engine is able to call a server side script engine using the web method. For example, a client device 102, 104 may be able to change orientation, and thus, change how the screen is formatted. When a user changes the orientation of the device 102, 104, a client side script engine may alert the browser of the change in orientation. The web method receives the alert from the client side script engine that the orientation has changed, and the web method calls the navigation controller 610 included in the server side script engine to generate the page view and dynamic content for a new orientation.

Alternatively, the server side script engine call the client side script engine using the web methods. In this method, the server 106 is able to call a client side script engine to generate an interface on the client device 102, 104. For example, if a notification is sent to a client device 102, 104, the server 106 calls a client side script engine to generate an interface for the notification, such as a pop-up alert. The pop-up alert may have a dismiss button or a respond button. Both the dismiss and respond buttons rely on the client side script engine to interface with the server 106. For example, the dismiss button may send a message to the web methods to notify the server 106 that the notification was read by the user. The server 106 updates the database that the notification was read by the device 102, 104 by using a server side script engine. The reply button, on the other hand, may call a service within the conference collaboration tool, such as the chat service 120. In this case, the web methods again call server side script engine to generate the chat service page view in response to a client side script engine request. Thus, the web methods interface client side script engines and server side script engines, which may be two different interfaces, such as JavaScript and ASP or C#.

Although not illustrated, a survey service may also be included. The survey service may allow a presenter to upload a question and a list of survey answers. The survey may be created during the conference or before the conference. When attendees respond to the survey through the conference companion tool, the survey answers are uploaded to the server 106, and the server 106 provides live updates to devices 102, 104 which have answered the survey question as the survey answers are uploaded.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A conference collaboration system comprising:
a server connected to a network and configured to generate a page view requested by a client device over the network and provide dynamic content associated with the requested page view for display on a browser of the client device; and
a database connected to the server configured to store the dynamic content, update the dynamic content in response to commands from the server, and provide the dynamic content to the server in response to requests from the server,
wherein the dynamic content is associated with a plurality of services, each service is shown in a page view, and the dynamic content and the services are associated with a conference,
wherein the server is configured to determine an authorization level of a user interacting with the client device and provide at least one of the plurality of page views and at least a portion of the dynamic content in response to the authorization level,
wherein server identities a characteristic of the client device and formats a page view based on the identified characteristic, and
wherein the dynamic content is updated or created responsive to one or more actions performed by one or more client devices during the conference.

2. The conference collaboration tool of claim 1, wherein the server restricts which services the client device is allowed to access in response to the authorization level.

3. The conference collaboration tool of claim 1, wherein the server restricts which dynamic content the client device is allowed to access in response to the authorization level.

4. The conference collaboration tool of claim 1, wherein the plurality of services includes a chat service, a notification service, a document access service, an schedule service, a presentation service, a survey service, and administrative service.

5. The conference collaboration tool of claim 4, wherein the server provides read-only dynamic content in the document access service if the authorization level of the user interacting with the client device has only read-only privileges.

6. The conference collaboration tool of claim 1, wherein the conference is a live, in-person meeting.

7. The conference collaboration tool of claim 1, wherein the server updates dynamic content or provides new dynamic content if the authorization level of the user interacting with the client device and the service allows the client device to receive new dynamic content.

8. The conference collaboration tool of claim 1, wherein the plurality page views may be organized in a hierarchy including a main menu, service page views organized under the main menu, and sub-views respectively organized under the services page views.

9. The conference collaboration tool of claim it the server updates the dynamic content of the requested page view at periodic intervals after an initial page load.

10. The conference collaboration tool of claim 1, wherein the client device is a mobile device.

11. The conference collaboration tool of claim 1, wherein the authorization levels include system administrator with full privileges to all conferences, presenter with full privileges to the conference, registered user with privileges determined by the system administer and presenter, guest with privileges determined by the system administer and presenter and no username or password, and door account with privileges to see a description of the conference and send a notification.

12. A computer-implemented method comprising:
receiving, by a server, a request for a page view and dynamic content from a web browser of a client device through a network during a conference;
determining, by a server, an authorization level of a user interacting with the client device;
identifying, by a server, a characteristic of the client device;
accessing, by a server, the dynamic content associated with the conference front a database, wherein the dynamic content is to be input into content tables in the page view displayed on the client device;
filtering, by a server, the dynamic content from the database according to the authorization level;
generating, by a server, the page view for the client device;
formatting, by a server, the page view based on the identified characteristic of the client device;
providing, by a server, the dynamic content for the page view to the client device; and
updating, by a server, the dynamic content in the database according to an input received from the client device, wherein the page view reloads at a periodic interval for displaying the updated dynamic content.

13. The method of claim 12, wherein the server restricts which services the client device is allowed to access in response to the authorization level.

14. The method of claim 12, wherein the server restricts which dynamic content the client device is allowed to access in response to the authorization level.

15. The method of claim 12, wherein the conference is a live, in-person meeting.

16. The method of claim 12, wherein the page views may be organized in a hierarchy including a main menu, service page views organized under the main menu, and sub-views respectively organized under the services page views.

17. The method of claim 12, wherein the client device is a mobile device.

18. The method of claim 12, wherein the authorization levels include system administrator with full privileges, presenter with full privileges to the conference, registered user with privileges determined by the system administer and presenter, guest with privileges determined by the system administer and presenter and no username or password, and door account with privileges to see a description of the conference and send a notification.

19. The method of claim 12, wherein the client device may request page views and dynamic content to be sent to an organizer during the conference to ask a question or provide a comment.

20. A computer-implemented method comprising:
receiving, by a server, a request from web browser of a client device of an attendee or organizer through a network during a conference for a document displayed in a document service associated with the conference;
determining, by a server, an authorization level of the attendee or organizer interacting with the client device;
accessing, by a server, the document requested by the client device;
determining, by a server, whether the document may be viewed by the client device according to the authorization level;
identifying, by a server, a characteristic of the client device;
generating, by a server, the page view for the document if the client device has access to the document;
formatting, by a server, the pace view based on the characteristic of the client device; and
providing, by a server, the dynamic content of the document in the page view to the client device.

* * * * *